US011895452B2

(12) United States Patent
Meng et al.

(10) Patent No.: US 11,895,452 B2
(45) Date of Patent: Feb. 6, 2024

(54) BONE CONDUCTION MICROPHONE

(71) Applicant: AAC ACOUSTIC TECHNOLOGIES (SHENZHEN) CO., LTD., Shenzhen (CN)

(72) Inventors: Zhenkui Meng, Shenzhen (CN); Tingting Hong, Shenzhen (CN); Kai Wang, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 101 days.

(21) Appl. No.: 17/827,815

(22) Filed: May 30, 2022

(65) Prior Publication Data

US 2023/0209235 A1 Jun. 29, 2023

(30) Foreign Application Priority Data

Dec. 29, 2021 (CN) ......................... 202111645833.X

(51) Int. Cl.
*H04R 1/08* (2006.01)
*H04R 1/02* (2006.01)
*H04R 1/04* (2006.01)

(52) U.S. Cl.
CPC ............. *H04R 1/083* (2013.01); *H04R 1/025* (2013.01); *H04R 1/04* (2013.01); *H04R 2201/003* (2013.01)

(58) Field of Classification Search
CPC .......... H04R 1/083; H04R 1/025; H04R 1/04; H04R 2201/003
USPC .......................................................... 381/151
See application file for complete search history.

(56) References Cited

U.S. PATENT DOCUMENTS 4,533,795 A * 8/1985 Baumhauer, Jr. ........ H04R 1/06 381/174
2011/0235841 A1* 9/2011 Tanaka ..................... H04R 1/38 381/355
2016/0173977 A1* 6/2016 Lim ......................... H04R 1/04 381/334
2018/0050902 A1* 2/2018 Sun ........................... B81B 7/02
2021/0092509 A1* 3/2021 Rusconi Clerici Beltrami ........... H04R 31/00

* cited by examiner

*Primary Examiner* — Sean H Nguyen
(74) *Attorney, Agent, or Firm* — W&G Law Group

(57) ABSTRACT

The present invention provides a bone conduction microphone including a housing and a circuit board connected with the housing. The circuit board has an acoustic channel. The microphone further includes a vibration assembly forming a first conduction cavity and a second conduction cavity. The vibration assembly includes a vibration member and a frame. The frame, the vibration member and the circuit board form a first conduction cavity. The frame, the vibration member and the circuit board form a second conduction cavity. The vibration of the vibration member is conducted to one side of the vibration diaphragm, and is also conducted to the other side of the vibration diaphragm. Compared with the related art, the bone conduction microphone of the present invention can effectively improve the sensitivity and the signal to noise ratio.

10 Claims, 4 Drawing Sheets

BONE CONDUCTION MICROPHONE

FIELD OF THE PRESENT DISCLOSURE

The present invention relates to electro-acoustic transducers, and more particularly to a bone conduction microphone.

DESCRIPTION OF RELATED ART

The bone conduction microphone converts the slight vibration of the bones of the head and neck caused by human speech into an electric signal. Since it is different from the traditional microphone that collects sound through air conduction, it can restore the sound with high definition even in a noisy environment, so as to avoid the noise interference caused by air-borne sound, and ensure the sound weight extremely high. However, the sensitivity and signal to noise ratio (SNR) of the bone conduction microphone in the related art are still insufficient.

SUMMARY OF THE PRESENT INVENTION

The main purpose of the present invention is to provide a bone conduction microphone effectively improving sensitivity and signal to noise ratio.

For achieving the object mentioned above, the invention provides a bone conduction microphone, comprising: a housing; a circuit board engaging with the housing for forming a containment space, and including an acoustic channel; a vibration assembly located in the containment space for dividing the containment space into a first conduction cavity and a second conduction cavity which are respectively communicated with the acoustic channel, the vibration assembly including a vibration member spaced from the circuit board, and a frame connecting the vibration member and the circuit board; the frame, the vibration member and the circuit board being enclosed with the housing for forming the first conduction cavity; the frame, the vibration member and the circuit board being jointly enclosed for forming the second conduction cavity; and a MEMS chip located in the second conduction cavity and fixed to the circuit board, and including a vibration diaphragm between the circuit board and the vibration member. A vibration of the vibration member is conducted to one side of the vibration diaphragm through the first conduction cavity and the acoustic channel, and the vibration of the vibration member is also conducted to the other side of the vibration diaphragm through the second conduction cavity.

Further, the circuit board includes an external circuit board connected with the housing for forming the containment space, and an internal circuit board fixed on a side of the external circuit board facing the containment space; the frame, the vibration member, the external circuit board and the internal circuit board are enclosed with the housing to form the first conduction cavity; the frame is fixed on the side of the internal circuit board away from the external circuit board, and the acoustic channel includes a sound channel connected with the first conduction cavity and a sound hole connected with the sound channel; at least one direction of the external circuit board and the internal circuit board is recessed to form the sound channel, and the sound hole penetrates the internal circuit board.

Further, the external circuit board includes a first circuit board connected to the internal circuit board and the housing respectively, and a second circuit board fixed on a side of the first circuit board away from the internal circuit board; the first circuit board is recessed for forming the sound channel.

Further, the sound channel penetrates the first circuit board.

Further, the vibration assembly includes a membrane fixed on the frame and a weight fixed on the membrane.

Further, the weight is fixed on a side of the membrane facing the first conduction cavity; or, the weight is fixed on a side of the membrane facing the second conduction cavity.

Further, the frame comprises a first frame fixed on the circuit board, a second frame connected with the vibration member, and a separation board sandwiched between the first frame and the second frame; the separation board separates the second conduction cavity into a first cavity and a second cavity; a through hole connecting the first cavity and the second cavity is provided in the separation board; and the MEMS chip is arranged in the second cavity.

Further, an orthographic projection of the through hole on the vibration diaphragm is located within the vibration diaphragm.

Further, the bone conduction microphone includes an ASIC chip located in the second conduction cavity and fixed to the circuit board for being electrically connected to the MEMS chip.

Further, the MEMS chip comprises a substrate having a back cavity and a capacitive assembly fixed on the substrate for covering the back cavity; the substrate is fixed on the circuit board, and the back cavity is connected with the acoustic channel; the capacitive assembly is formed by the vibration diaphragm and a back plate spaced from the vibration diaphragm.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Embodiment 1

Figure 1:
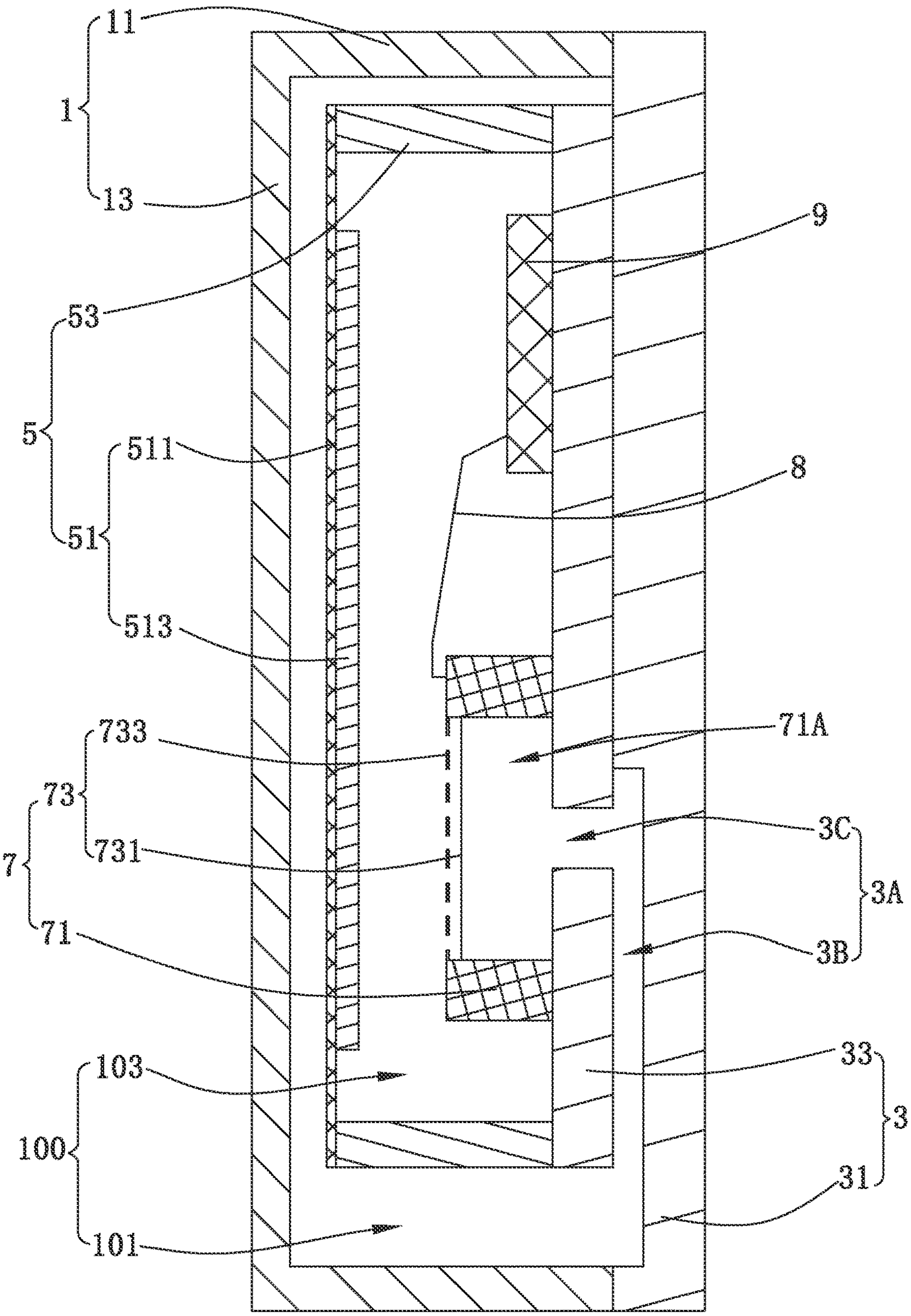
FIG. 1 is a structural diagram of a bone conduction microphone in accordance with a first exemplary embodiment of the present invention.
Figure 2:
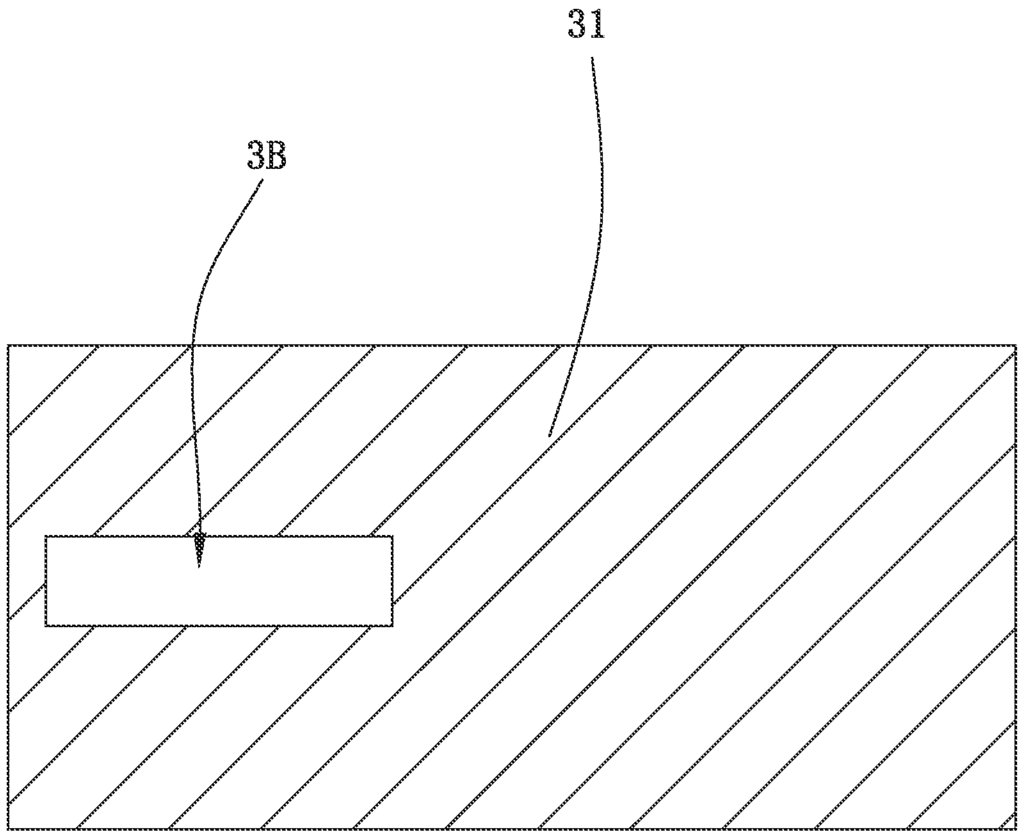
FIG. 2 is a structural diagram of an external circuit board in the bone conduction microphone shown in FIG. 1.

Referring to FIG. 1, a bone conduction microphone includes a housing 1, a circuit board 3, a vibration assembly 5 and a MEMS (Micro-Electro-Mechanical Systems) chip 7.

The housing 1 engages with the circuit board 3 for forming a containment space 100.

As shown in FIG. 1, the housing 1 includes a bottom wall 11 opposite to the circuit board 3 and arranged at intervals, and a side wall 13 extending from peripheral edge of the bottom wall 11 to the circuit board 3 and connected to the circuit board 3.

The circuit board 3 is arranged with an acoustic channel 3A.

The vibration assembly 5 is placed in the containment space 100 and divides the containment space 100 into a first conduction cavity 101 and a second conduction cavity 103 which are both connected with the acoustic channel 3A, respectively.

The assembly 5 includes a vibration member 51 opposite to the circuit board 3 and spaced apart, and a frame 53 connecting the vibration member 51 and the circuit board 3. Wherein, the frame 53, the vibration member 51 and the circuit board 3 are enclosed with housing 1 to form the first conduction cavity 101, and the frame 53, the vibration member 51 and the circuit board 3 are jointly enclosed to form the second conduction cavity 103.

The MEMS chip 7 is arranged in the second conduction cavity 103 and fixed to the circuit board 3.

The MEMS chip 7 includes a substrate 71 arranged with a back cavity 71A and a capacitive assembly 73 mounted on the substrate 71 and covering the back cavity 71A.

The capacitive assembly 73 includes a vibration diaphragm 731 and a back plate 733 spaced apart from the vibration diaphragm 731. The vibration diaphragm 731 is provided between the circuit board 3 and the vibration member 51.

Wherein, the vibration of the vibration member 51 is conducted to one side of the vibration diaphragm 731 through the first conduction cavity 101 and the acoustic channel 3A, and the vibration of the vibration member 51 is also conducted to the other side of the vibration diaphragm 731 through the second conduction cavity 103. Specifically, when the vibration signal transmitted through the bone is transmitted to the circuit board 3 or/and the housing 1, the vibration transmitted to the circuit board 3 or/and the housing 1 is transmitted to the vibration member 51 via the frame 53 to make the vibration member 51 vibrate in response to the vibration signal. The vibration of vibration member 51 will cause both the air pressure of the first conduction cavity 101 and the air pressure of the second conduction cavity 103 to change. Specifically, when the air pressure in the first conduction cavity 101 increases, the air pressure in the second conduction cavity 103 decreases; when the air pressure in the first conduction cavity 101 decreases, the air pressure in the second conduction cavity 103 increases. Thereby, the vibration of the vibration member 51 is conducted to one side of the vibration diaphragm 731 through the first conduction cavity 101 and the acoustic channel 3A and the vibration of the vibration member 51 is also conducted to the other side of the vibration diaphragm 731 through the second conduction cavity 103. Therefore, the vibration of the vibration member 51 can act on the vibration diaphragm 731 through the two paths respectively through the differential mode, so that the sensitivity of the vibration of the vibration diaphragm 731 can be improved. The vibration of the vibration diaphragm 731 will cause the capacitance of the capacitive assembly 73 to change, so that the vibration signal transmitted through the bone is converted into an electric signal. Wherein, the electric signal picked up by the MEMS chip 7 is output through the circuit board 3.

It should be noted that, in order to enclose the frame 53, the vibration member 51 and the circuit board 3 with housing 1 to form the first conduction cavity 101 and vibration of vibration member 51 to be conducted to one side of vibration diaphragm 731 through the first conduction cavity 101 and the acoustic channel 3A, the bottom wall 11 must be spaced apart from the vibration member 51, the side wall 13 is bound to be at least partially spaced apart from the frame 53. As shown in the Fig., the entire side wall 13 is spaced from the frame 53.

In this embodiment, preferably, the housing 1 has an electromagnetic shielding function. For example, the housing 1 with electromagnetic shielding function can be made of conductive metal. In this way, the housing 1 can protect the internal structure of the bone conduction microphone while shielding the influence of external electromagnetic waves.

In this embodiment, the circuit board 3 includes an external circuit board 31 connected with the housing 1 in a covering manner to form the containment space 100 and an internal circuit board 33 fixed on the side of the external circuit board 31 facing the containment space 100. And the frame 53, the vibration member 51, the external circuit board 31 and the internal circuit board 33 are enclosed with housing 1 to form the first conduction cavity 101. The frame 53 is fixed on the side of the internal circuit board 33 away from the external circuit board 31. The acoustic channel 3A includes a sound channel 3B connected with the first conduction cavity 101 and a sound hole 3C connected with the sound channel 3B. Wherein, at least one direction of the external circuit board 31 and the internal circuit board 33 is recessed to form the sound channel 3B, and the sound hole 3C penetrates through the internal circuit board 33.

It should be noted that at least one direction of the external circuit board 31 and the internal circuit board 33 is recessed to form the sound channel 3B, the following setting methods are included:

The sound channel 3B is formed by the external circuit board 31 being recessed in the direction away from the internal circuit board 33;

The sound channel 3B is formed by the internal circuit board 33 being recessed in the direction away from the external circuit board 31;

A part of the sound channel 3B is formed by the external circuit board 31 being recessed in the direction away from the internal circuit board 33, and the other part is formed by the internal circuit board 33 being recessed in the direction away from the external circuit board 31.

As shown in FIG. 1, the sound channel 3B is formed by the external circuit board 31 being recessed in a direction away from the internal circuit board 33.

In this embodiment, the vibration assembly 51 includes a membrane 511 fixed on the frame 53 and a weight 513 fixed on the membrane 511.

As shown in FIG. 1, the weight 513 is fixed on the side of the membrane 511 facing the second conduction cavity 103. It can be understood that, in other embodiments, the weight 513 can also be fixed on the side of the membrane 511 facing the first conduction cavity 101.

It should be noted that when the weight 513 is fixed on the side of the membrane 511 facing the second conduction cavity 103, the weight 513 and the MEMS chip 7 should have a sufficient distance in order to avoid the impact of the MEMS chip 7 on the vibration of the weight 513. When the weight 513 can also be fixed on the side of the membrane 511 facing the first conduction cavity 101, the weight 513 and the bottom wall 11 should have a sufficient distance in order to avoid the impact of the bottom wall 11 of the housing 1 on the vibration of the weight 513.

In order to further improve the sensitivity of the bone conduction microphone, in this embodiment, the bone conduction microphone also includes an ASIC chip 7 electrically connected to the MEMS chip 7, the ASIC chip 7 is arranged in the second conduction cavity 103 and fixed on the internal circuit board 33 of the circuit board 3. Wherein, ASIC chip 7 provides external bias for MEMS chip 7. Effective bias will enable MEMS chip 7 to maintain stable acoustic sensitivity and electrical parameters in the entire operating temperature range. It can also support microphone structure design with different sensitivities, making the design more flexible and reliable.

In this embodiment, the ASIC chip 7 and the MEMS chip 7 are electrically connected through the conductive wire 8.

As shown in FIG. 1, the substrate 71 is directly fixed on the internal circuit board 33 of the circuit board 3, and the back cavity 71A is directly connected to the sound hole 3C of the acoustic channel 3A. It can be understood that, in other embodiments, the substrate 71 can also be fixed on the internal circuit board 33 of the circuit board 3 through a gasket. Alternatively, the substrate 71 is fixed on the internal circuit board 33 of the circuit board 3 through the capacitive assembly 73, and the back cavity 71A is in direct connection with the second conduction cavity 103.

Embodiment 2

Figure 3:
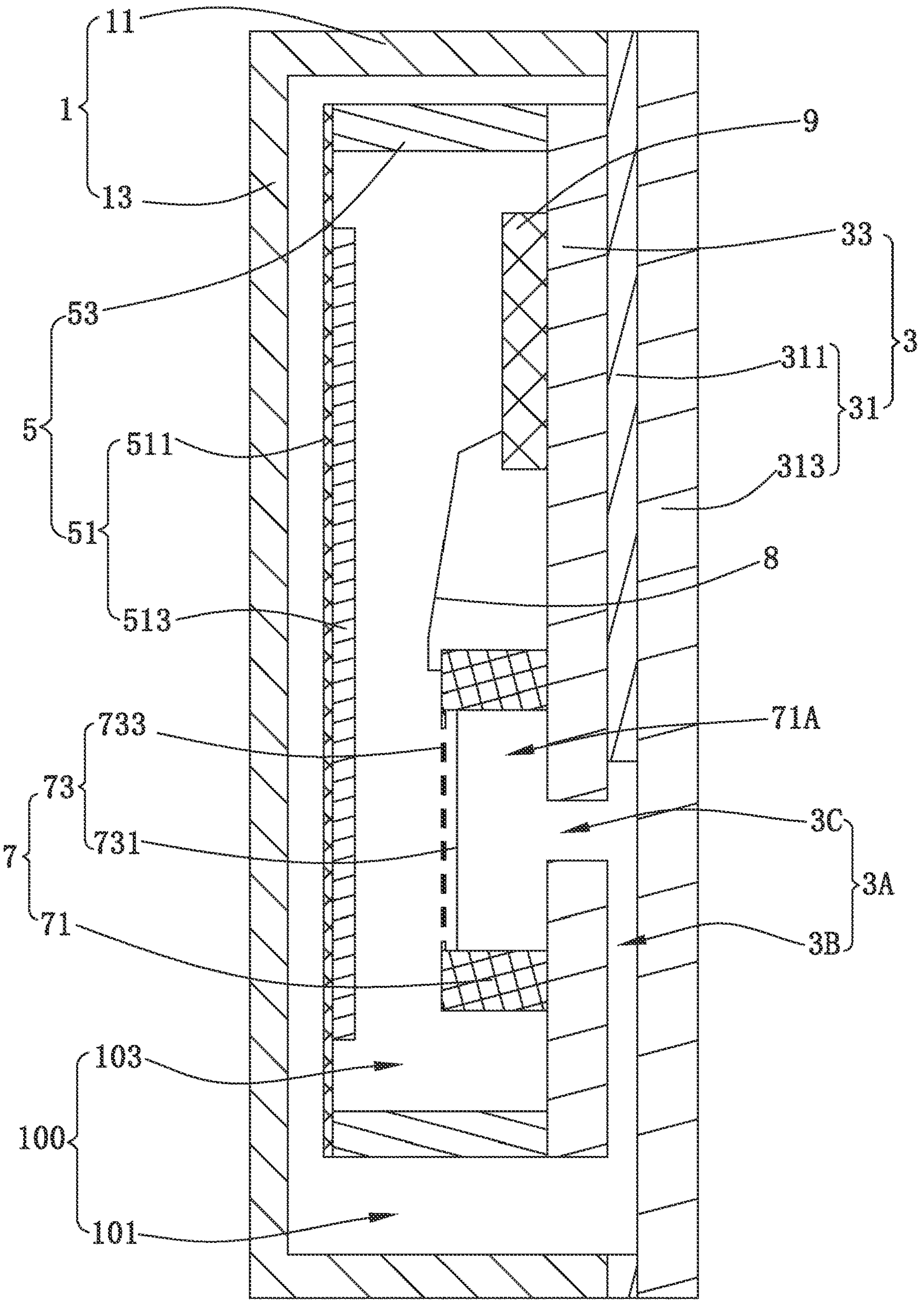
FIG. 3 is a structural diagram of a bone conduction microphone in accordance with a second exemplary embodiment of the present invention.

Referring to FIG. 3, the difference between this embodiment and the first embodiment is only that the external circuit board 31 includes a first circuit board 311 connected to the internal circuit board 33 and the housing 1 respectively, and a second circuit board 313 fixed on the side of the first circuit board 311 away from the internal circuit board 33. The first circuit board 311 is recessed to form the sound channel 3B.

As shown, the sound channel 3B is a hole structure passing through the first circuit board 311. It can be understood that, in other implementation manners, the sound channel 3B can also be set to: A part of the sound channel 3B is formed by the first circuit board 311 being recessed in the direction away from the internal circuit board 33, and the other part is formed by the internal circuit board 33 being recessed in the direction away from the first circuit board 311.

Embodiment 3

Figure 4:
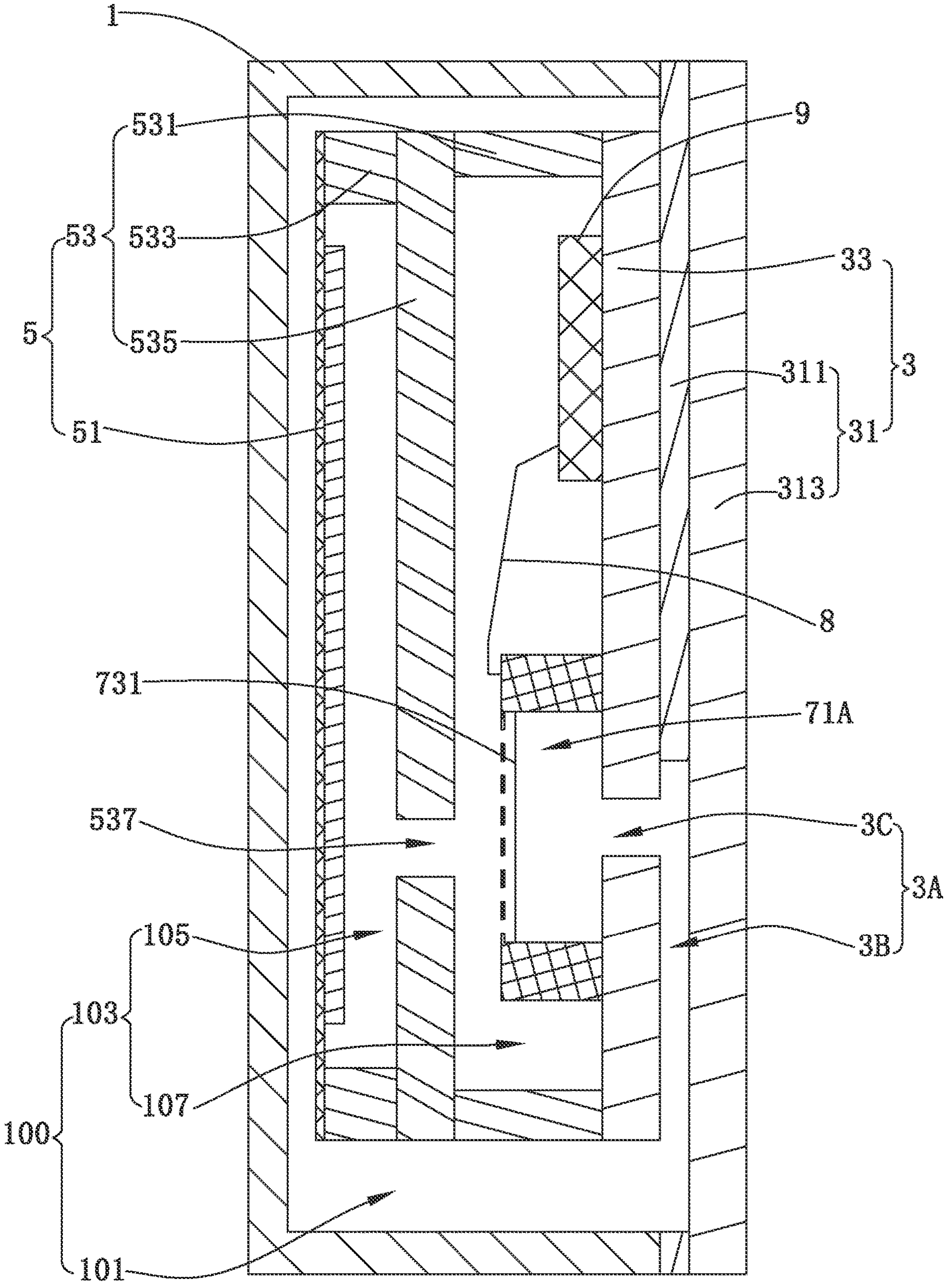
FIG. 4 is a structural diagram of a bone conduction microphone in accordance with a third embodiment of the present invention.

Please refer to FIG. 4. The difference between this embodiment and the second embodiment 2 will be described as follows.

The frame 53 includes a first frame 531 fixed on the internal circuit board 33 of the circuit board 3, a second frame 533 connected to the vibration member 51, and a separation board 535 sandwiched between the first frame 531 and the second frame 533. The separation board 535 separates the second conduction cavity 103 into a first cavity 105 and a second cavity 107. A through hole 537 connecting the first cavity 105 and the second cavity 107 is arranged through the separation board 535, and the MEMS chip 7 and the ASIC chip 7 are arranged in the second cavity 107. That is to say, the first frame 531, the separation board 535 and the internal circuit board 33 of the circuit board 3 are jointly enclosed to form the first cavity 105. The second frame 533, the separation board 535 and the vibration member 51 are jointly enclosed to form the second cavity 107.

In this embodiment, the orthographic projection of the through hole 537 on the vibration diaphragm 731 is within the range of the vibration diaphragm 731. With this arrangement, the vibration sensitivity of the vibration diaphragm 731 can be further improved.

It should also be noted that, in the second embodiment, the first circuit board 311 and the internal circuit board 33 can also be configured as an integrated structure.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A bone conduction microphone, comprising:

a housing;

a circuit board engaging with the housing for forming a containment space, and including an acoustic channel;

a vibration assembly located in the containment space for dividing the containment space into a first conduction cavity and a second conduction cavity which are respectively communicated with the acoustic channel, the vibration assembly including a vibration member spaced from the circuit board, and a frame connecting the vibration member and the circuit board; the frame, the vibration member and the circuit board being enclosed with the housing for forming the first conduction cavity; the frame, the vibration member and the circuit board being jointly enclosed for forming the second conduction cavity;

a MEMS chip located in the second conduction cavity and fixed to the circuit board, and including a vibration diaphragm between the circuit board and the vibration member;

wherein a vibration of the vibration member is conducted to one side of the vibration diaphragm through the first conduction cavity and the acoustic channel, and the vibration of the vibration member is also conducted to the other side of the vibration diaphragm through the second conduction cavity.

2. The bone conduction microphone as described in claim 1, wherein the circuit board includes an external circuit board connected with the housing for forming the containment space, and an internal circuit board fixed on a side of the external circuit board facing the containment space; the frame, the vibration member, the external circuit board and the internal circuit board are enclosed with the housing to form the first conduction cavity; the frame is fixed on the side of the internal circuit board away from the external circuit board, and the acoustic channel includes a sound channel connected with the first conduction cavity and a sound hole connected with the sound channel; at least one direction of the external circuit board and the internal circuit board is recessed to form the sound channel, and the sound hole penetrates the internal circuit board.

3. The bone conduction microphone as described in claim 2, wherein the external circuit board includes a first circuit board connected to the internal circuit board and the housing respectively, and a second circuit board fixed on a side of the first circuit board away from the internal circuit board; the first circuit board is recessed for forming the sound channel.

4. The bone conduction microphone as described in claim 1, wherein the sound channel penetrates the first circuit board.

5. The bone conduction microphone as described in claim 1, wherein the vibration assembly includes a membrane fixed on the frame and a weight fixed on the membrane.

6. The bone conduction microphone as described in claim 5, wherein the weight is fixed on a side of the membrane facing the first conduction cavity; or, the weight is fixed on a side of the membrane facing the second conduction cavity.

7. The bone conduction microphone as described in claim 1, wherein the frame comprises a first frame fixed on the circuit board, a second frame connected with the vibration member, and a separation board sandwiched between the first frame and the second frame; the separation board separates the second conduction cavity into a first cavity and a second cavity; a through hole connecting the first cavity and the second cavity is provided in the separation board; and the MEMS chip is arranged in the second cavity.

8. The bone conduction microphone as described in claim 7, wherein an orthographic projection of the through hole on the vibration diaphragm is located within the vibration diaphragm.

9. The bone conduction microphone as described in claim 1 further including an ASIC chip located in the second conduction cavity and fixed to the circuit board for being electrically connected to the MEMS chip.

10. The bone conduction microphone as described in claim 1, wherein the MEMS chip comprises a substrate having a back cavity and a capacitive assembly fixed on the substrate for covering the back cavity; the substrate is fixed on the circuit board, and the back cavity is connected with the acoustic channel; the capacitive assembly is formed by the vibration diaphragm and a back plate spaced from the vibration diaphragm.

* * * * *